Patented Nov. 8, 1938

2,136,011

UNITED STATES PATENT OFFICE 2,136,011

METHOD FOR THE PREPARATION OF TERPENE ETHERS

Irvin W. Humphrey, Wilmington, Del., assignor to Hercules Powder Company, Wilmington, Del., a corporation of Delaware No Drawing. Application March 7, 1936, Serial No. 67,704

22 Claims. (Cl. 260—611)

This invention relates to a method for the production of ethers of terpene compounds and to the product thereof. More particularly, it relates to a method for the production of terpene ethers by the addition of an alcohol at the double bond of an unsaturated terpene compound.

The ethyl ether of camphene has been produced heretofore by the reaction of ethyl alcohol with the complex cyclic terpene, camphene, in the presence of sulfuric acid as a catalyst. Thus, Semmler (Ber. 33 pp. 3420–32) produced such a compound by boiling a mixture of camphene, ethyl alcohol and sulfuric acid under reflux for several hours. He, likewise, succeeded in producing the ethyl ethers of nopiene and sabinene, but was entirely unsuccessful in producing the ethyl ether of the monocyclic terpene limonene. Neither polyhydric alcohols nor monohydric alcohols containing three or more carbon atoms have been used heretofore to produce ethers by a condensation reaction.

Now, I have found that organic sulfonic acids are superior to sulfuric acid as catalysts for the addition of an alcohol at a double bond of an unsaturated terpene compound.

I have found further that I can produce terpene ethers by the reaction of an unsaturated monocyclic or unsaturated complex cyclic terpene compound with a polyhydric alcohol.

The method in accordance with this invention consists of reacting an unsaturated terpene compound with an alcohol in the presence of an organic sulfonic acid such as, for example, p-toluene sulfonic acid, phenol sulfonic acid, benzene sulfonic acid, ethyl sulfonic acid, propyl sulfonic acid, butyl sulfonic acid, benzene disulfonic acid, naphthalene disulfonic acid, phenol disulfonic acid, a sulfonic acid derived from a natural resin acid, or from one of its derivatives, as, abietyl sulfonic acid, hydrogenated abietyl sulfonic acid, etc., at a suitable temperature. The reaction produced by this method appears to involve the addition of the acid catalyst to a double bond of the unsaturated terpene, to produce an unstable intermediate compound which reacts with the alcohol to produce a terpene ether.

The products, in accordance with this invention, are ethers produced by the addition of a polyhydric alcohol, to an unsaturated terpene compound, at a double bond of the terpene compound. The ether so produced may contain one or more unreacted hydroxyl groups derived from a polyhydric alcohol, or it may contain a hydroxyl group on the terpenic group carried over from the original terpene compound reacted. Alternately, the ethers produced may contain one terpene group and two groups derived from a polyhydric alcohol, or may contain two or more terpenic groups linked by ether linkages to one hydrocarbon chain derived from a polyhydric alcohol. Again, the product may contain one terpenic group linked to one hydrocarbon chain derived from a polyhydric alcohol by two ether linkages.

It will be understood that a great number of ethers are produced by the combination of the various polyhydric alcohols with the various unsaturated terpene compounds, in the various ways described hereinbefore, and that all such compounds are included in the scope of this invention. Such ethers will be termed "additive" terpene ethers to distinguish them from ethers produced by reaction involving a hydroxyl group of a terpene alcohol.

In the production of "additive" terpene ethers by the reaction of an unsaturated terpene with an alcohol, in accordance with the method of this invention, the unsaturated terpene may react with the alcohol to an extent such that the product shows no unsaturated characteristics. On the other hand, the product may show some unsaturation, which may, if desired, be eliminated by contact with hydrogen in the presence of a hydrogenation catalyst, such as, for example, platinum, palladium, nickel, etc. Thus, the hydrogenation of unsaturated additive terpene ethers may be effected by contacting the ether with 2% of an active supported nickel hydrogenation catalyst and hydrogen under a pressure of about 20 to about 250 atmospheres, at a temperature within the range of about 75° C. to about 200° C.

The terpene compound reacted by the method in accordance with this invention may be an unsaturated monocyclic terpene compound such as, for example, dipentene, terpinene, terpinolene, phellandrene, sylvestrene, alpha terpineol, beta terpineol, terpineol, or other unsaturated monocyclic terpene alcohol, or mixtures thereof; it may be an unsaturated complex cyclic terpene capable of isomerization to an unsaturated monocyclic terpene compound, which may be, for example, alpha pinene, carene, etc., or it may be a bicyclic terpene which is not readily isomerized under the conditions of the reaction, such as, for example, nopinene, camphene and bornylene. Polymerized terpenes, as for example, terpenes produced by the polymerization of pinene, dipentene, etc., may also be reacted by the method in accordance with this invention. It will be found, however, that such polymerized terpenes react less readily than unpolymerized terpenes.

These terpene compounds need not be in the form of pure compounds to be treated in accordance with this invention, but may be reacted in crude form. Thus, in place of the several pure terpene compounds, crude natural mixtures of terpene compounds, as for example, turpentine, pine oil, etc., or mixtures of terpenes with petroleum or other saturated hydrocarbons, may be used. Various fractions from these mixtures may also be used without the necessity of isolating the compounds in their pure state after the etherification of a crude mixture of terpene compounds or a mixture of terpene compounds. The products may be separated from the unreacted components of the reaction mixture by fractional distillation, by extraction with a selective solvent for the ether or unreacted alcohol which is substantially immiscible with the reaction mixture, or by a combination of these methods.

The polyhydric alcohol used to produce the additive terpene ethers, in accordance with this invention, may be, for example, ethylene glycol, propylene glycol, diglycol, trimethylene glycol, glycerol, mannitol, sorbitol, pentaerytherite etc. Monohydric alcohols, such as, for example, methyl alcohol, ethyl alcohol, normal propyl alcohol, iso-propyl alcohol, normal butyl alcohol, secondary butyl alcohol, amyl alcohol, ethylene chlorohydrin, tetrahydro-furfuryl alcohol, benzyl alcohol, lauryl alcohol, stearyl alcohol, oleyl alcohol, abietyl alcohol, pimarol, hydrogenated abietyl alcohol, hydropimarol, the mono-ethyl, mono-butyl, mono-methyl ether of polyhydric alcohols as ethylene or diethylene glycol, etc., or mixtures thereof may be reacted with terpene compounds, in accordance with the method of this invention, to produce additive terpene ethers. The alcohol employed in the reaction will preferably be anhydrous, or substantially so.

The relative proportions of the alcohol and the terpene compound used in the reaction mixture will depend on the molecular weight of the alcohol. To obtain the highest yields of the terpene ether, it is desirable to use not less than one and one-half moles, and preferably at least three moles of the aliphatic alcohol per mole of the terpene compound.

The concentration of catalyst used in the reaction may be varied over a wide range. Thus, the amount of catalyst used, calculated as sulfonic acid, may be within the range of about 0.1% to about 25.0% of the weight of alcohol contained in the reaction mixture. The preferred amount of catalyst will depend on the particular alcohol and the particular terpene compound reacted. In general, however, it is preferable to have the catalyst present in amounts within the range of about 1% to about 10% by weight.

The temperature at which the reaction is carried out will depend largely upon the particular terpene being reacted, and may be varied over a range of about 30° C. to about 200° C. From the standpoint of yield, reaction velocity and operating simplicity, it is generally preferable to maintain the temperature of the reaction mixture within the range of about 75° C. to about 150° C.

The procedure for the production of terpene ethers, in accordance with this invention, is illustrated by the examples which follow.

*Example I*

100 parts by weight of alpha-pinene, 200 parts by weight of methanol and 1 part by weight, of p-toluene sulfonic acid were refluxed at 75° C. for thirty hours. The reaction mixture was then washed with water to remove any unreacted methanol and steam-distilled to give a fraction of 95 parts, which analyzed 6.6% methoxy, or a content of 36% terpene ethers, and a second higher-boiling fraction of 5 parts. Neither fraction had the odor characteristic of alpha-pinene. Equally good results were obtained by treatment of the same reaction mixture for 8 hours in an autoclave at a temperature of 140°–150° C.

*Example II*

540 parts by weight of alpha-pinene, 120 parts by weight of ethylene glycol, and 1.2 parts by weight p-toluene sulfonic acid were refluxed 70 hours at a maximum temperature of 145° C. After washing with water to remove the unreacted ethylene glycol, the reaction mixture was fractionated to yield a fraction of 100 parts and a higher boiling fraction of 20 parts. The first of these fractions analyzed 3.8% hydroxyl, showing it to be a mixture of mono- and di-terpene ethers of glycol.

*Example III*

One hundred parts by weight of technical alpha terpinene, 200 parts by weight of methanol, and 1 part by weight of p-toluene sulfonic acid were refluxed under atmospheric pressure for a period of about thirty-five hours. The reaction mixture was then fractionated to produce 95 parts of a fraction which contained 38% ethers.

*Example IV*

One thousand grams of ethylene glycol, 1700 grams of alpha-pinene and 25 grams of benzene sulfonic acid were agitated at 40–60° C. for five hours, and the product worked up as in Example II. A yield of 675 grams of glycol terpene ethers (specific gravity 0.982) was secured.

*Example V*

One thousand grams of methanol, 10 cc. of phenol sulfonic acid and 1000 cc. of dipentene were refluxed for a period of 7 hours. The mixture was then cooled, the oily layer separated and washed with water. The oily layer was then fractionated over caustic in vacuo to obtain the following fractions:

(A) A mixture of dipentene, terpinene, terpinolene.

(B) Terpinyl methyl ether containing a small amount of 1,8-di-methoxy menthane. The yield of this fraction was 90% on the basis of the dipentene used.

It will be understood that the details and examples hereinbefore set forth are illustrative only, and that the invention as herein broadly described and claimed is in no way limited thereby.

The additive terpene ethers produced in accordance with this invention are useful as solvents and softeners in coating compositions and in printing inks.

No claim is made herein for a terpene ether produced from an unsaturated terpene compound by the reaction of a monohydric alcohol containing not less than three carbon atoms, since such a product is claimed in the copending application of Donald H. Sheffield, Serial No. 64,169, filed February 15, 1936.

What I claim and desire to protect by Letters Patent is:

1. A terpene ether produced from an unsaturated terpene compound by the addition of a polyhydric alcohol to a double bond of an unsaturated terpenic group contained in the said terpene compound.

2. The method of producing a terpene ether which consists of reacting an alcohol at a double bond contained in an unsaturated terpenic group of a terpene compound, in the presence of an organic sulfonic acid.

3. The method of producing a terpene ether which consists of reacting an unsaturated terpene hydrocarbon with an alcohol in the presence of an organic sulfonic acid.

4. The method of producing a terpene ether which consists of reacting a monohydric alcohol at a double bond contained in an unsaturated terpenic group of a terpene compound, in the presence of an organic sulfonic acid.

5. The method of producing a terpene ether which consists of reacting a polyhydric alcohol at a double bond contained in an unsaturated terpenic group of a terpene compound, in the presence of an organic sulfonic acid.

6. A terpene ether produced from an unsaturated terpene hydrocarbon by the addition of a polyhydric alcohol to a double bond of an unsaturated terpene hydrocarbon.

7. A terpene ether produced from an unsaturated terpene alcohol by the addition of a polyhydric alcohol to a double bond contained in an unsaturated terpenic group in said terpene alcohol.

8. A terpene ether produced from an unsaturated terpene compound by the addition of an aliphatic glycol to a double bond of an unsaturated terpenic group contained in the said terpene compound.

9. The method of producing a terpene ether which consists of reacting a polyhydric alcohol at a double bond of an unsaturated terpenic group contained in a terpene compound, in the presence of p-toluene sulfonic acid.

10. The method of producing a terpene ether which consists of reacting an aliphatic glycol at a double bond of an unsaturated terpenic group contained in a terpene compound, in the presence of an organic sulfonic acid.

11. The method of producing a terpene ether which consists of reacting ethylene glycol at a double bond of an unsaturated terpenic group contained in a terpene compound, in the presence of an organic sulfonic acid.

12. The method of producing a terpene ether which includes reacting a liquid polyhydric alcohol at a double bond of an unsaturated terpenic group contained in a terpene compound in the presence of an aromatic sulfonic acid.

13. A terpene ether produced from an unsaturated monocyclic terpene hydrocarbon by the addition of a liquid polyhydric alcohol to a double bond contained in an unsaturated terpenic group contained in said terpene hydrocarbon.

14. A terpene ether produced from an unsaturated monocyclic terpene hydrocarbon by the addition of an aliphatic glycol to a double bond contained in an unsaturated terpenic group contained in said terpene hydrocarbon.

15. A terpene ether produced from an unsaturated complex cyclic terpene hydrocarbon by the addition of a liquid polyhydric alcohol to a double bond contained in an unsaturated terpenic group contained in said terpene hydrocarbon.

16. A terpene ether produced from an unsaturated terpene alcohol by the addition of an aliphatic glycol to a double bond contained in an unsaturated terpenic group in said terpene alcohol.

17. A terpene ether produced from an unsaturated terpene compound by the addition of glycerol to a double bond of an unsaturated terpenic group contained in said terpene compound.

18. A terpene ether produced by the addition of a liquid polyhydric alcohol to a double bond of alpha terpineol.

19. A terpene ether produced by the addition of a liquid polyhydric alcohol to dipentene.

20. A terpene ether produced by the addition of a liquid polyhydric alcohol to alpha pinene.

21. A terpene ether produced by the addition of a polyhydric alcohol to a double bond of alpha pinene.

22. A terpene ether produced by the addition of ethylene glycol to a double bond of alpha pinene.

IRVIN W. HUMPHREY.